United States Patent [19]

Ells

[11] 3,952,593

[45] Apr. 27, 1976

[54] LIQUID LEVEL GAUGE

[75] Inventor: Edward G. Ells, Norwich, N.Y.

[73] Assignee: Liquidometer Corporation, Norwich, N.Y.

[22] Filed: Aug. 1, 1974

[21] Appl. No.: 493,565

[52] U.S. Cl. .............................. 73/304 C; 317/261
[51] Int. Cl.² ......................................... G01R 27/26
[58] Field of Search ..................... 73/304 R, 304 C; 317/246, 261, 242

[56] References Cited
UNITED STATES PATENTS

| | | | |
|---|---|---|---|
| 2,563,280 | 8/1951 | Schafer | 73/304 C |
| 3,430,140 | 2/1969 | Preikschat | 317/246 |
| 3,777,257 | 12/1975 | Geisselmann | 73/304 C |

FOREIGN PATENTS OR APPLICATIONS

| | | | |
|---|---|---|---|
| 811,295 | 4/1959 | United Kingdom | 317/261 |
| 1,149,569 | 4/1969 | United Kingdom | 317/261 |

*Primary Examiner*—Richard E. Aegerter
*Assistant Examiner*—A. Jason Mirabito
*Attorney, Agent, or Firm*—H. Gibner Lehmann; K. Gibner Lehmann

[57] ABSTRACT

A gauging apparatus for monitoring the height or level of liquid contained in a storage tank or the like. The apparatus comprises a probe device in the form of an elongate piece of insulating material carrying a first plurality of spaced-apart conducting members disposed along the length thereof, and a second plurality of conducting members disposed adjacent the members of the first plurality and forming multiple capacitors therewith, respectively. The insulating material, as well as the members carried thereby, are covered by a coating of insulating resin such that they are sealed against physical contact with the liquid being monitored. Detector means including amplifiers and indicators are provided for sensing which members of the first plurality are submerged in liquid at any particular time. The detector means responds to changes in the dielectric of the capacitors as they successively become submerged to provide indications of the liquid level in the tank. In an alternate embodiment of the invention, two detector means are provided, one of which responds only to liquids having a relatively high dielectric constant, such as salt water or the like. The arrangement is such that in the case of a tank partially filled with oil and partially filled with salt water, there are obtained indications of the total quantity of liquid in the tank, as well as the relative proportion of the liquid having the higher dielectric constant, in this case, salt water. The difference between these readings yields the amount of oil remaining in the tank.

15 Claims, 8 Drawing Figures

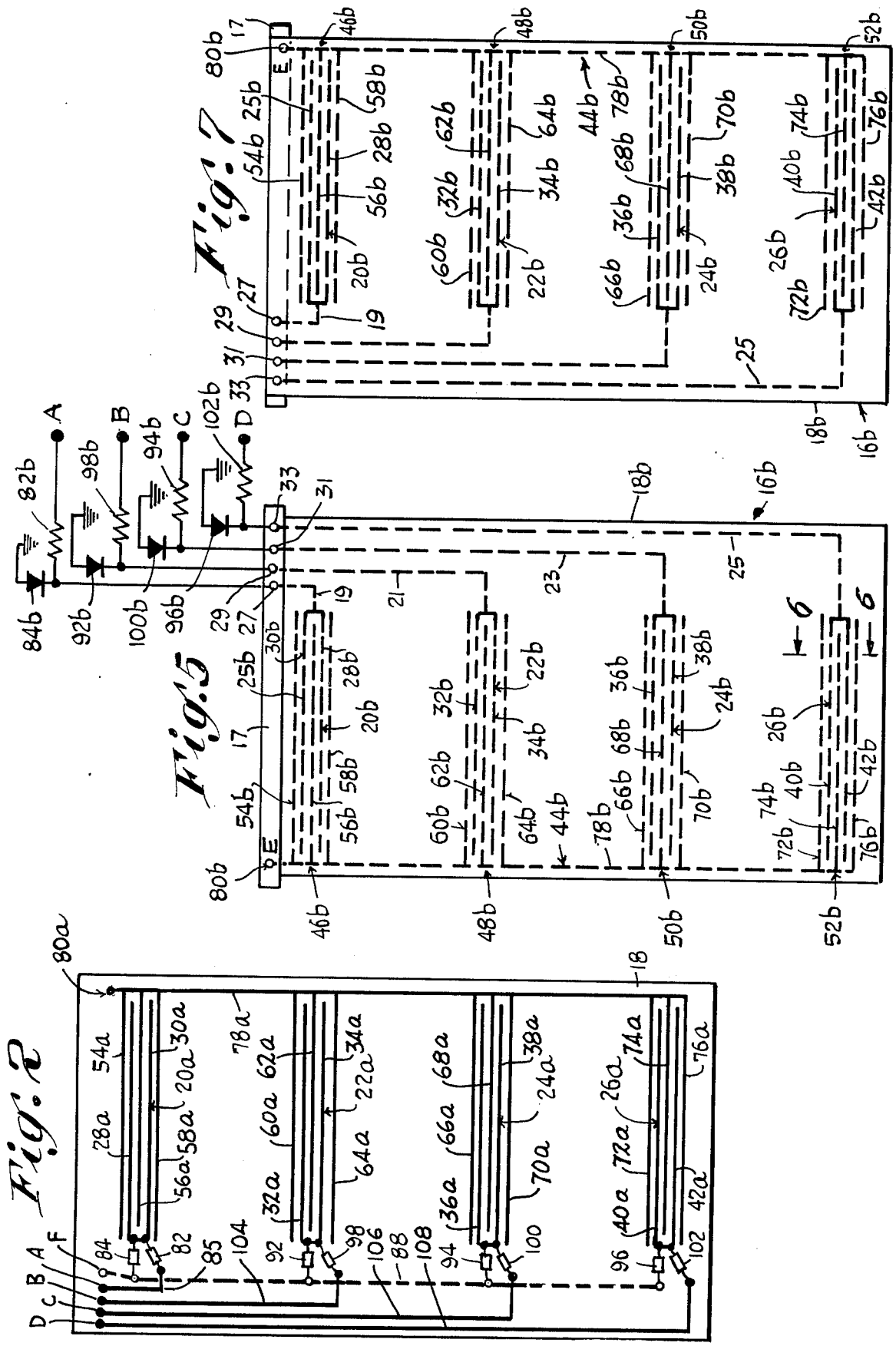

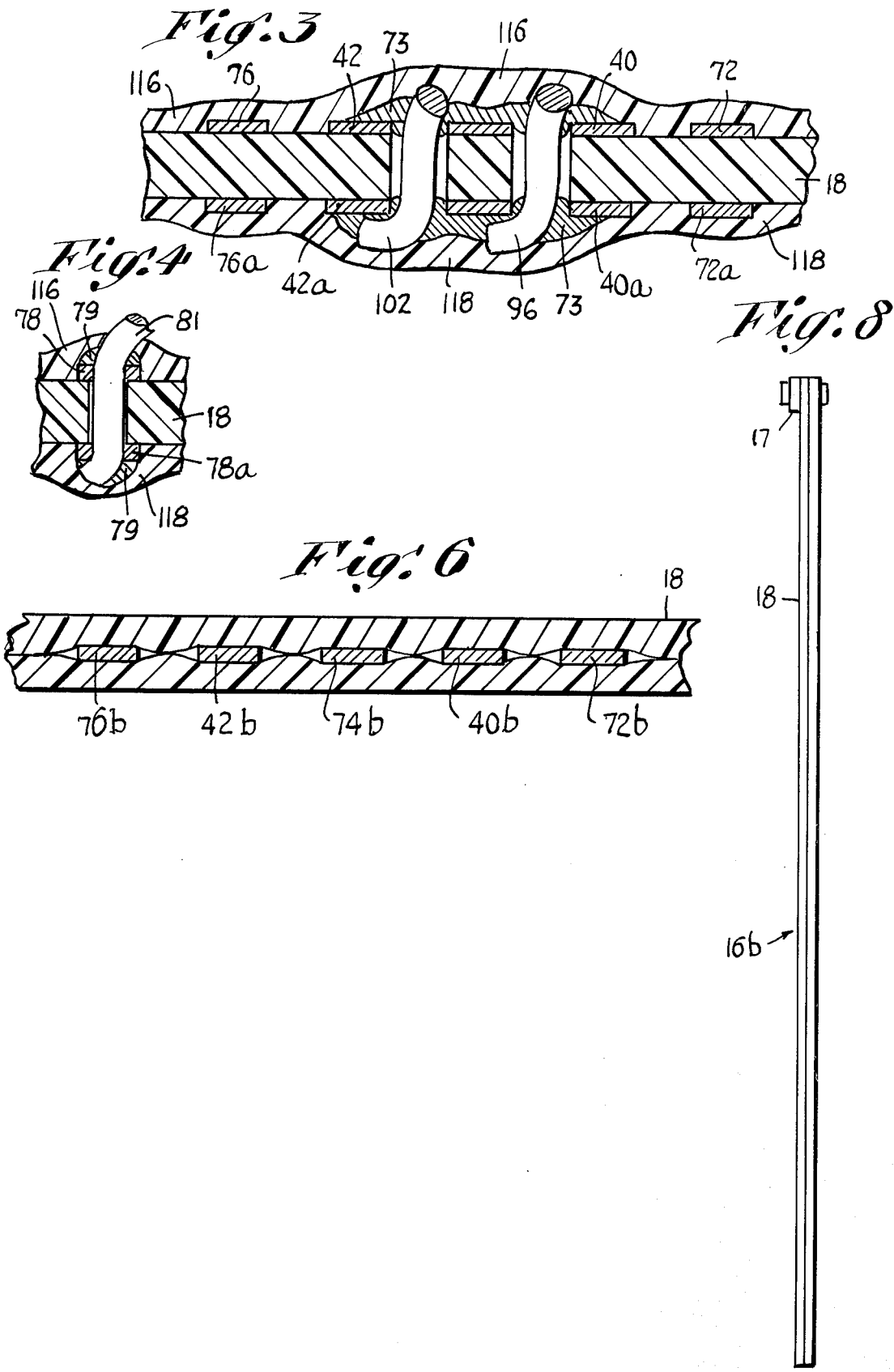

LIQUID LEVEL GAUGE

CROSS REFERENCES TO RELATED APPLICATIONS

Copending application of Edward G. Ells entitled "Improved Liquid Level Gauging Apparatus," U.S. Ser. No. 459,591, filed Apr. 10, 1974, and having a common ownership with the present application.

BACKGROUND

This invention relates generally to liquid level gauging systems, and more particularly to systems employing sets of conducting members adapted to be immersed in a tank in order to provide readings of the level of liquid contained therein.

In the past quite a number of different level gauging devices have been proposed and produced. In many instances of liquid storage, as in the case of oil storage tanks of the type employed on ships, salt water is pumped into the tank so as to displace or remove the oil. Under such circumstances, the oil, being less, dense, floats on the surface of the water, and there is formed a well-defined barrier or border at the interface between the two substances. In certain arrangements heretofore proposed, a float having the proper initial buoyancy was adapted to follow the interface and thus provide an indication of its location at all times. Unfortunately, the tendency of such floats to gather foreign material usually upset the buoyant characteristics of the device thus causing it to sink to the bottom of the tank, after which repairs or other maintenance of the float apparatus were usually required.

Other schemes involving upstanding electrodes which were spaced from one another and adapted to be immersed in the liquid in the tank generally suffered plugging of the gap between them, thus providing erroneous readings and requiring considerable periodic maintenance and trouble shooting. In addition, such arrangements involving the use of conducting electrodes immersed in the liquid being gauged often encountered problems with the corrosive effects of the liquids on the electrodes, particularly where salt water was being used. Under these circumstances, the electrodes tended to deteriorate very rapidly, and undesirable changes in both the physical and electrical characteristics of the electrodes resulted.

SUMMARY

The above drawbacks and disadvantages of prior liquid level gauging systems are obviated by the present invention, which has for an object the provision of a novel and improved level gauge and probe device therefor both of which are simple in construction, reliable in operation, and substantially maintenance and troublefree over prolonged periods of operation. A related object is the provision of a gauge as above, which suffers little or no deterioration with time and which is not materially effected by the corrosive nature of certain liquids such as salt water. A still further object is the provision of a gauge which is not susceptible to malfunction due to debris which inadvertently may come in contact with the portion that is immersed in the tank, and which can further provide accurate readings of the relative proportions in a tank of two different, immiscible liquids such as oil and salt water.

The above objects are accomplished by a novel liquid level indicator and sensing probe device therefor, the latter comprising an elongate piece of insulating material adapted to be supported upright in the liquid being gauged, a plurality of conducting members carried by the insulating piece and spaced from one another along the length thereof, and a second plurality of conducting members connected to each other and carried by the insulating piece, the conducting members of said second plurality being located at spaced intervals on the insulating piece and being disposed adjacent the conducting members of the first plurality, respectively. An insulating barrier in the form of a coat of resin, such a polyurethane, covers the conducting members and the piece so as to physically separate and seal them from the liquid being gauged. In connection with the level indicator, means are provided for establishing electrical circuits to the conducting members from a suitable detector adapted to sense which of the conducting members of the first plurality are submerged at any particular time. The arrangement is such that the detector senses changes in the capacitance between each of the conducting members of the second plurality and the corresponding conducting members of the first plurality, as the latter become successively submerged in the liquid of the tank. The detector includes an indicator for providing visual indications of the number of conducting members which are submerged at any particular time; there is thus provided an accurate indication of the level of liquid in the tank.

In an alternate embodiments, a liquid level indicator device is provided for gauging the relative proportions of two immiscible liquids disposed one above the other in a storage tank, the device comprising a source of electrical signals, an upright, electrically conducting probe part for immersion in the liquids being gauged, a second probe part connected with the signal source and cooperable with the first probe part, the second probe part comprising an upright row of electrodes insulated from each other and adapted for immersion in the liquids in proximity to the first-mentioned probe part, a first detector means responsive to signals from the source and connected with one of said probe parts for designating which of the electrodes of the upright row are submerged in one of the liquids, and an additional detector means responsive to signals from the source and connected with said one probe part for designating which of the electrodes of said upright row are submerged in either of the liquids. The first of the detector means includes an indicator, and an amplifying device which is connected with suitable biasing means, such that the detector responds only to liquid (such as salt water) having a relatively high dielectric constant. The arrangement is so constituted that, in the case of a tank partially filled with oil and partially filled with salt water, there are obtained independent readings of the total amount of liquid in the tank, as well as of the absolute amount of salt water in the tank. The quantity of oil is thus obtainable as the difference between these two readings.

Other features and advantages will hereinafter appear.

FIG. 2 is a rear elevational view of the probe device illustrated in FIG. 1.

FIG. 3 is a greatly enlarged section taken on line 3—3 of FIG. 1.

FIG. 4 is a greatly enlarged section taken on line 4—4 of FIG. 1.

FIG. 5 is a front elevation of a modified probe device, constituting another embodiment of the invention.

FIG. 6 is a greatly enlarged section taken on line 6—6 of FIG. 5.

FIG. 7 is a rear elevation of the probe device of FIG. 5.

FIG. 8 is a right side elevation of the probe device of FIG. 5.

Figure 1:
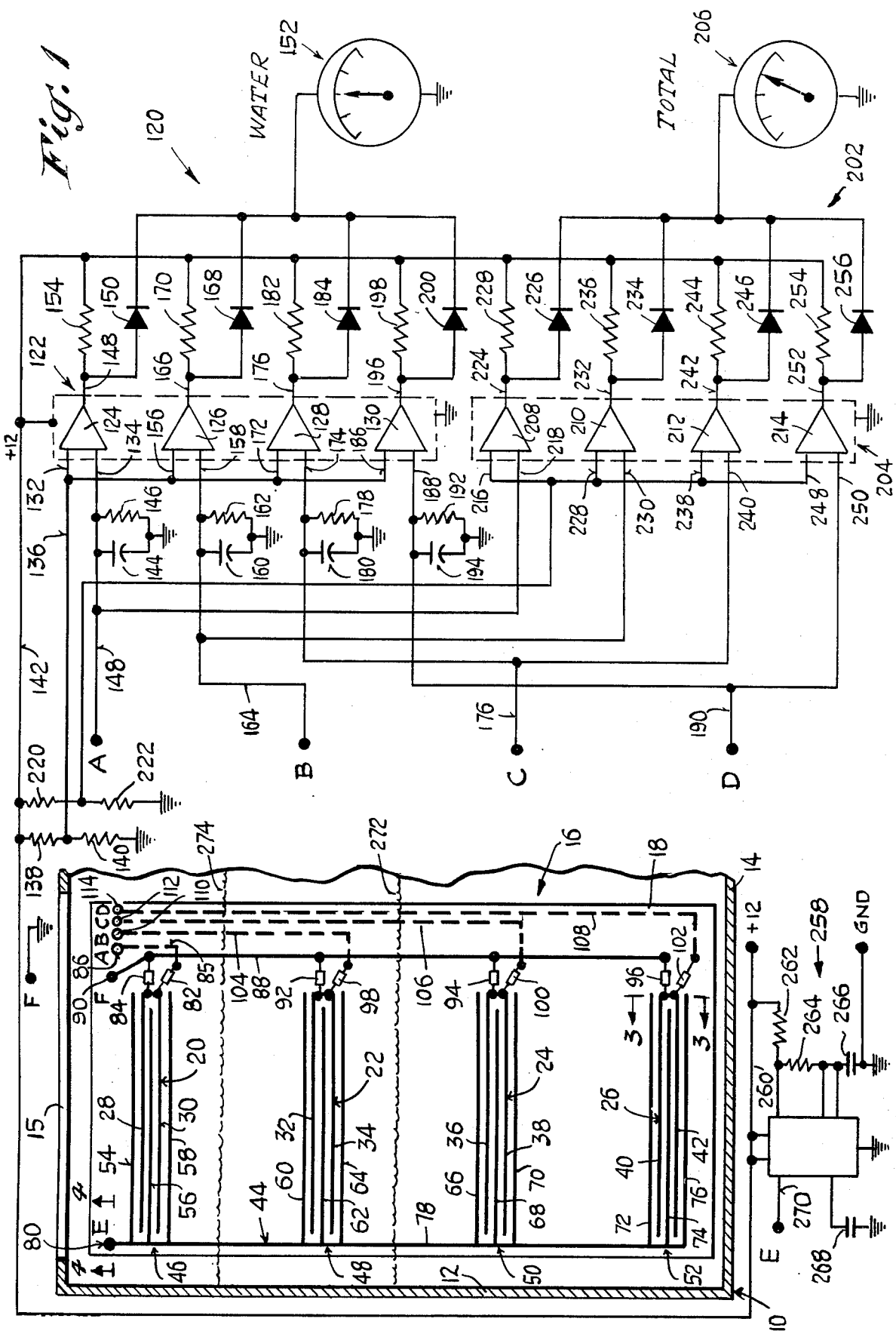
FIG. 1 is a view partially in elevation and partially diagrammatic of the improved liquid level gauging apparatus of the present invention, comprising a probe device and detector means.

Referring to FIG. 1 there is illustrated a large storage tank 10 for holding a quantity of liquid such as fuel oil or the like, the tank comprising upright side walls 12 and a bottom wall 14, and having a top access opening 15.

In accordance with the present invention there is provided a novel and improved liquid level gauging apparatus for monitoring the height of liquid contained in the tank, the apparatus comprising a probe device generally designated by the numeral 16 adapted for immersion in the liquid being gauged, and amplifier and detector circuitry for use therewith, to be described later. The probe device 16 comprises an elongate piece 18 of insulating material such as fiberglass, printed circuit board or the like, on which there is carried a plurality of conducting members in the form of tracks of copper on the board. A first plurality of conducting members is designated by the numerals 20, 22, 24, 26, and as shown, the members are spaced from one another along the length of the insulating piece. The member 20 comprises a pair of spaced coextensive fingers 28, 30 which are joined at one end, thus forming a U-shaped conductor piece. In a similar manner, the members 22–24 have spaced, coextensive fingers 32, 34 and 36, 38, and the member 26 has spaced, coextensive fingers 40, 42, respectively.

The insulating piece 18 also carries a second plurality of conducting members 46, 48, 50, 52, disposed respectively adjacent the members 20–26 of the first plurality, each member 46–52 having spaced, coextensive fingers which are interleaved with the corresponding fingers of members 20–26. The spaced fingers of member 46 are designated 54, 56, 58; similarly, the member 48 comprises spaced fingers 60, 62, 64; member 50 comprises spaced fingers 66, 68, 70 and member 52 comprises spaced fingers 72, 74 and 76. The fingers 54–76 are joined or connected along their left hand edges in FIG. 1 by an upright strip 78. These conducting members may be formed by conventional printed circuit techniques which are well known in the art. By such an arrangement, the conducting members 20 and 46 form a small capacitor whose dielectric constant depends partially on the characteristics of the insulating material employed, but to a larger extent upon the nature of the liquid in which the probe 16 is submerged, as will be described below. Similarly, additional capacitors are formed respectively by members 22 and 48, 24 and 50, and 26 and 52. It is noted that all the capacitors have one common plate (strip 78) and that electrical connection or circuit to this plate can be made via a terminal or pad 80, labelled with the capital letter E in FIG. 1.

Connected to the member 20 in FIG. 1 are a resistor 82 and a diode 84. These two components are disposed closely adjacent the member, and are recessed into holes or cut-outs in the board so as to minimize the overall length of their leads. The other lead of resistor 82 extends to a track 85 (on the opposite side of the board in FIG. 1) having a terminal pad 86 for connection to detector circuitry, to be described below. This pad is indicated in FIG. 1 by the capital letter a. The other lead (anode) of the diode 84 is connected to a track 88 which extends to a terminal pad 90, indicated in FIG. 1 by the capital letter F. In a similar manner, additional diodes 92, 94, 96 are connected respectively to the members 22, 24, 26 and have their other leads all connected to track 88. Resistors 98, 100, and 102 extend from the members 22–26, respectively to tracks 104, 106 and 108 (all on the opposite side of the board in FIG. 1). These tracks extend to terminal pads 110, 112, 114 respectively, labelled in FIG. 1 with the capital letters B, C and D. The diodes 84 and 92–96 all have their anode terminals connected to track 88 in the present embodiment, and their cathode terminals connected to the respective conducting members 20–26.

Referring to FIGS. 2–4 it is seen that duplicate conducting members are provided on the opposite side of the board 18, and are connected in parallel with the members illustrated in FIG. 1.

Specifically, each of the fingers 54–76 in FIG. 1 has corresponding fingers in FIG. 2 indicated by the numerals 54a–76a, referred to in the claims as a fourth plurality of conducting members. These latter fingers are in alignment with those on the front side of the board, and are connected or joined by a corresponding conductor strip 78a in FIG. 2, terminating in a pad 80a. When a lead or wire 81 is connected to this pad, it is soldered to both sides of the board, as in FIG. 4, thus connecting the strips 78 and 78a as well as their corresponding fingers in parallel with one another. In FIG. 4, the solder is indicated by the numeral 79. Similarly, the fingers 28–42 in FIG. 1 overlie similar fingers 28a–42a on the opposite side of the board 18 in FIG. 2, the fingers 28a–42a being referred to in the claims as a third plurality of conducting members. Referring to FIG. 3, when the diodes and resistors are connected to the fingers 28–42, their leads extend through the board and are soldered to fingers 28a–42a as shown. Thus, the members 20 and 20a are connected in parallel with one another, as well as members 22 and 22a, 24 and 24a, and 26 and 26a respectively. The duplicate conductors on opposite sides of the board have the effect of substantially increasing the value of the four capacitors formed thereby, as will be understood. In FIG. 3, th solder is indicated by the numeral 73. The leads of the components 96 and 102 thus constitute means providing electrical circuits to the conducting member 26a disposed on the opposite side of the board 18. The leads of components 84, 82, 92, 98 and 94, 100 extend through the board 18 in a manner analogous to that illustrated in FIG. 3, thus effecting parallel connection of the corresponding conducting members on opposite sides of the board 18.

By the present invention an insulating barrier is provided on the board 18 in the form of a coating of insulating resin such as polyurethane. This is applied as a liquid to both sides of the board following assembly, such that the board and tracks (conducting members) carried thereby will substantially impervious to the liquid in which the probe is being submerged. Conductivity to direct current between the liquid and the conducting members is greatly decreased so as to be almost negligible. However, the a.c. impedance between a conducting member such as that indicated by the numeral 26 and the conducting member 52 in not negligible, but instead depends in part upon the dielectric constant of the fluid or liquid surrounding the same, as will be further explained below. The layers of resin are illustrated in FIG. 3 and are indicated by the numerals 116 and 118, respectively.

Referring again to FIG. 1 and in accordance with the present invention there is provided a novel detector means generally designated by the numeral 120 for sensing which of the conducting members 20–26 is submerged in liquid at any particular time. The detector comprises an amplifying device 122 which includes four digital comparator-type amplifiers 124, 126, 128, 130, respectively. The amplifier 124 has a pair of input terminals 132, 134, the terminal 132 being fed a fixed, predetermined d.c. voltage on line 136, derived from biasing resistors 138, 140 connected to a positive supply line 142 carrying +12 volts d.c. The amplifiers 124-130 may be of the integrated circuit variety, known by the commercial designation LM3900. The amplifiers are supplied with a +12 volt potential from the positive bus 142 as shown.

Connected with the other input 134 is a filter capacitor 144 and biasing resistor 146, the latter two components each having one lead grounded as shown. The input extends via lead 148 to the terminal marked by the capital A, and is adapted to be connected to the terminal pad 86, also indicated by the capital letter A on the board 18 in the tank. In some cases, the amplifying device 122 can be mounted directly on the board 18; alternately, the device 122 can be disposed remotely as required.

The output terminal 148 is connected through an isolating diode 150 to an indicator 152 in the form of a d.c. milliammeter. Resistor 154 serves as a load resistor for amplifier 124, and is connected to the positive supply bus 142 as shown.

The amplifier 126 has input terminals 156, 158, the latter having a filter capacitor 160 and biasing resistor 162 connected to ground. This input extends via lead 164 to the terminal indicated by the capital letter B, which is adapted to connect with the pad 110 similarly designated on the board 18. The output terminal 166 is connected to the indicator 152 through isolating diode 168, and a load resistor 170 extends from the output trerminal to the positive bus 142.

Amplifier 128 has inputs 172, 174, the latter being connected via a line 176 to the terminal indicated by the capital letter C, which is adapted to be connected to the terminal pad 112 similarly marked on board 18. Associated with the amplifier 128 are a resistor 178 and capacitor 180 at the input, and load resistor 182 and diode 184 at the output terminal 176. In a similar manner, the amplifier 130 includes inputs 186, 188, the latter extending via line 190 to a terminal indicated by the capital letter D, adapted to be connected to the terminal pad 114 similarly marked on board 18. A resistor 192 and capacitor 194 extend from the input 188 to ground. The output terminal 196 extends to a load resistor 198 and a diode 200 connected to the indicator 152. It is noted that the inputs 132, 156, 172 and 186 are all connected together and receive a fixed bias voltage from the biasing resistors 138, 140, which may be respectively 1.0 and 0.22 Megohm.

Referring again to FIG. 1 an additional detector means 202 is provided, comprising an additional amplifying device 204, together with an additional indicator or d.c. milliammeter 206. The amplifying device 204 comprises four amplifiers 208, 210, 212, 214 of the digital comparator-type as in the first amplifying device 122. The amplifier 208 has input terminals 216, 218, the latter terminal being connected to line 148 as shown. Input 216 is connected to source of d.c. voltage derived from bias resistors 220, 222 connected between the positive supply bus 142 and ground. The output terminal 224 of amplifier 208 is connected through an isolation diode 226 to the milliammeter 206, and resistor 228 constitutes a load impedance for the amplifier 208 as above.

Amplifier 210 has input terminals 228, 230, the latter terminal being connected with line 164. The terminal 228 is biased from the resistors 220, 222 with a fixed d.c. voltage. The output terminal 232 is connected through an isolation diode 234 to the milliameter 206, and resistor 236 serves as a load impedance. In a similar manner, amplifier 212 has input terminals 238, 240, and an output terminal 242. Connected with the latter are load resistor 244 and diode 246. Amplifier 214 has input terminals 248, 250 and an output terminal 252. Resistor 254 and diode 256 are connected as described above in connection with the amplifiers 208-212. Resistors 220 and 222 may be respectively 1.0 and 0.15 Megohm.

Resistors 154, 170, 182 and 198, together with diodes 150, 168, 184 and 200 constitute a summing network for connecting the amplifying device 122 and indicator 152, and resistors 228, 236, 244 and 254, together with diodes 226, 234, 246, and 256 constitute an additional summing network for connecting the amplifying device 204 and indicator 206.

Referring again to FIG. 1 there is provided a source of a.c. voltage (square wave), the source being generally designated by the numeral 258. The source comprises an integrated circuit astable multivibrator and is supplied an operating voltage of +12 volts d.c. via line 260. Associated with the multivibrator are resistors 262, 264, and capacitors 266 and 268. The square wave signal appears on line 270 having a terminal indicated by the capital letter E. This is adapted to be connected to the terminal 80 of the board 18, the terminal 80 also being designated by the capital letter E. The frequency of the square wave generated can be varied between suitable limits determined by the values of certain of the components associated with the multivibrator 258. I have found that a satisfactory range for this frequency is 10 to 100 KHz.

The operation of the improved liquid level gauging apparatus can now be readily understood by referring to FIG. 1. Assuming that the tank 10 is empty, and the multivibrator 258 is supplying a square wave to the terminal indicated by the capital letter E on board 18, it will be seen that this a.c. signal will appear on the conducting members 46–52, and will be capacitively coupled to the conducting members 20, 22, 24 and 26. The coupled a.c. signal will have a predetermined, fixed amplitude, and will be rectified to pulsating d.c. levels on lines 148, 164, 176 and 190 by means of the diodes 84, 92, 94 and 96 and filter capacitors 144, 160, 180 and 194, respectively. It is noted that the terminal 90, which is also designated by the capital letter F on board 18 is connected to ground. The diode 84 and capacitor 144 thus constitute a half-wave rectifier and filter circuit, together with the capacitor formed by the conducting member 20 and the conducting member 46.

The resistors 138 and 140 establish a fixed bias voltage on the input leads 132, 156, 172 and 186, this voltage being greater in magnitude than the level of pulsating d.c. voltage appearing on any of the input terminals 134, 158, 174 and 188 when tank 10 is empty. Under these circumstances, the outputs of amplifiers 124–130 all assume a low digital level, and the reading on the meter 152 will be zero, indicating that the level of liquid in the tank is below the location of the conducting members 26 and 52.

In addition, the resistors 220, 222 establish a bias on the input terminals 216, 228, 238 and 248 of amplifiers 208–214, respectively, which exceeds the level of pulsating d.c. voltage appearing on any of the input terminals 218, 230, 240 and 250. Accordingly, the outputs on terminals 224, 232, 242 and 252 all assume a low digital level, and the reading on meter 206 indicates zero.

The present system is intended for use in installations where two immiscible liquids are contained in a tank, wherein one liquid is less dense than the other and floats on surface thereof. Such is the case in a storage tank for fuel oil where salt water is injected into the tank in order to either displace the oil or facilitate the removal thereof from the tank.

FIG. 1 illustrates a situation wherein the tank 10 is approximately one-half filled with salt water and approximately one-quarter filled with fuel oil, the interface between the water and oil being indicated by the numeral 272, and the interface between the oil and air being indicated by the numeral 274.

Assuming that the dielectric constant of air is approximately unity, the relative dielectric constant of fuel oil is in the vicinity of 4–5, and the relative dielectric constant of salt water is in excess of 76 depending on the concentration of salt. Under these circumstances, the conducting members 24 and 26 will be submerged in a salt water solution, although the actual conductors are insulated from the water (as far as d.c. is concerned) by the coating of polyurethane resin. Due to the relatively high dielectric constant of the salt water, the magnitude of the a.c. (square wave) signal coupled from the conducting member 52 to the conducting member 26 will be greatly increased, as will the magnitude of the a.c. signal coupled from the conducting member 50 to the conducting member 24. This results in a substantially increased d.c. level on lines 176 and 190 over that which occurred on these lines when the tank was empty. This increased level is sufficient to drive amplifiers 128 and 130 as well as amplifiers 212 and 214 to high digital logic levels at their outputs. Under these circumstances, diodes 184 and 200 become forward biased respectively through resistors 182 and 198, and contribute to a one-half scale reading of the meter 152. Similarly, diodes 246 and 256 become forward biased through resistors 244 and 254 respectively, and contribute to a one-half scale reading of the meter 206. In addition, it is noted that the conducting member 22 is submerged in oil, which has a dielectric constant intermediate that of air and salt water. Accordingly, an a.c. signal having an amplitude intermediate that appearing on conducting member 24 and that on conducting member 20 will be coupled to the conducting member 22, and will be rectified by means of diode 92 to thus appear as a pulsating d.c. level on line 164. This signal will be applied to the input terminal 158 of amplifier 126 and to the input terminal 230 of amplifier 210. The biasing resistors 138 and 140 are arranged to produce a higher d.c. level on the inputs 132, 156, 172 and 186, than that d.c. level produced by the biasing resistors 220, 222 and applied to the inputs 216, 228, 238 and 248. Thus, with the intermediate level of d.c. appearing on line 164, the amplifier 210 will assume a high digital logic level at its output, but the amplifier 126 will not. Clearly, this results from the relative values of resistors 138, 140, 220 and 222 which are chosen so as to enable the amplifying device 204 to respond to either oil or water, but to limit the response of the amplifying device 122 to salt water only. The resistors 138, 140, together with the +12 supply bus 142 constitute means for enabling the amplifying device 122 to respond only to signals from the conducting members or electrodes 20, 22, 24 and 26, having an amplitude greater than a predetermined value. Resistors 220, 224, together with the bus 142 similarly constitute means for enabling the amplifying device 204 to respond only to signals from the electrodes 20–26, having an amplitude greater than a second predetermined (lower) value. Thus, in the present example, the diode 234 becomes forward biased through resistor 236 and contributes an additional one-quarter scale reading to the meter 206. This added to the one-half scale reading contributed by amplfiers 212 and 214, resultes in a three-quarter scale deflection of the meter 206. Thus, this latter reading indicates the level of fluid in the tank regardless of whether the fluid is oil or salt water, whereas the meter 152 provides a reading of the level of salt water only. As a result, an indication of the quantity of oil remaining in the tank at any time can be obtained by merely subtracting these two readings.

It is noted that for the case just discussed, amplifiers 124 and 126 have low digital output levels, and thus do not contribute to the reading of meter 152, and also amplifier 208 has a low digital output level and thus contributes nothing to the reading of meter 206.

While the present discussion has been limited to the use of four amplifiers with each meter, which are associated with the four conducting members 20, 22, 24 and 26, it is readily apparent that additional conducting members could be used with additional amplifiers in order to provide readings of higher resolution. Depending on the dimensions of the particular tank employed, ten or more amplifiers could be used, together with additional conducting members similar to those indicated 20–26.

With the present arrangement, if only oil occupied the tank, the reading on meter 152 would be zero, since the amplitude of the signal appearing at the input terminals 134, 158, 174 and 188 would be insufficient to overcome the bias established by resistors 138, 140. Under the circumstances, the meter 206 would merely read the total quantity of liquid in the tank. That this reading would be an indication of the amount of oil in the tank could be radily determined, since the reading of the meter 152 would be zero, and this reading, when subtracted from the reading of the meter 206, would yield the net level of oil occupying the tank.

In some of the appended claims, the conducting members 20, 22, 24 and 26 are referred to as a first conducting probe part and the conducting members 46, 48, 50 and 52 referred to as an upright row of electrodes constituting a second probe part. As can be readily understood, both the first detector means 120 and the additional detector means 202 are operative at substantially the same time, such that readings of the relative liquid levels can be obtained simultaneously on the meters 152 and 206, respectively.

Another embodiment of the invention is ilustrated in FIGS. 5—8, showing a probe device 16$b$ which could be substituted for the probe device 16 illustrated in FIG. 1. The probe device 16b comprises an elongate piece of insulating material 18b which may be in the form of a sheet of dielectric film, having a plurality of conducting members 20b, 22b, 24b and 26b disposed at intervals along the length thereof, and a second plurality of conducting members 46b, 48b, 50b and 52b, disposed adjacent the members 20b–26b, respectively.

As in the previous embodiment, the member 20b comprises a pair of coextensive fingers 28b and 30b joined at one end so as to form a U-shaped conducting piece. This piece is connected by means of a track 19 to a terminal 27 which is carried on an insulating strip 17 fastened to the board 16b. Interleaved between the fingers 28b and 30b are additional coextensive fingers 54b and 56b and 58b, constituting the conducting member 46b. In a similar manner, the member 22b has coextensive fingers 32b and 34b which are interleaved with corresponding fingers 60b, 62b and 64b, the latter constituting the conducting member 48b. The member 22b is connected by means of a track 21 to a terminal 29 on the strip 17. Member 24b has fingers 36b and 38b interleaved with fingers 66b, 68b and 70b, the latter constituting the conducting member 50b. The conductor member 24b is connected by a track 23 to a terminal 31 on the strip 17. Conducting member 26b comprises coextensive fingers 40b, 42b and the conducting member 52b comprises fingers 72b, 74b and 76b interleaved with the fingers 40b, 42b as shown. The conducting member 26b is connected by means of a track 25 to a terminal 33 on the strip 17.

As shown in FIG. 6, the conducting members are sandwiched between two sets of dielectric films such as the type known as Kapton film. During the fabrication of the probe, the conducting members are deposited upon one sheet of the film in the desired pattern as shown in FIGS. 5 and 7, after which the additional sheet is placed over the conducting members and adhered to the first sheet by suitable fastening means. The arrangement is such that all of the conducting members 20b–26b and 46b–52b are insulated from the liquid in which the probe unit is to be immersed. As a result, corrosion of the members is virtually eliminated even where the probe device is used with a caustic substance such as salt water. As in the previous embodiment, conducting members 46b–52b are all connected together by means of a strip 78b which extends to a terminal 80b designated by the capital letter E.

In FIGS. 6 and 8, the thickness of the film 18 is somewhat exaggerated for clarity. Typically, the thickness of such films can be a few thousandths of an inch.

The diodes and resistors which were mounted directly on the board 18 in FIG. 1 are shown in FIG. 5 as being disposed externally of the probe 16b. Diode 84b and resistor 82b are shown as being connected to terminal 27 with the other end of resistor 82b being connected to a terminal designated by the capital letter A. Similarly, diodes 92b, 100b and 96b, and resistors 98b, 94b and 102b are shown connected to terminals 29, 31 and 33, respectively. The other ends of resistors 98b, 94b and 102b extend to terminals designated by the capital letters B, C and D, respectively. These terminals A, B, C and D in FIG. 5 are adapted to be connected to the similarly lettered terminals A–D in FIG. 1 when the probe unit 16b is substituted for the probe unit 16.

The operation of the probe unit illustrated in FIGS. 5–8 ia analogous to that of the embodiment of FIGS. 1–4, and need not be described further.

From the above it can be seen that I have provided a novel and improved liquid level gauging apparatus and a probe device therefor, which are simple in construction, reliable in operation and which require a minimum of servicing. The construction of the probe device is seen to be straightforward, and by virtue of the fact that the liquid never comes in physical contact with the conducting members, there is eliminated the possibility of corrosion and deterioration of the probe. As a result, a highly satisfactory, trouble-free performance is realized over prolonged periods of use.

The arrangement of the detector means whereby indications of the relative proportions of two different fluids contained in a tank are obtained, provides a highly satisfactory solution to what has been considered to be a most difficult gauging problem in the past. The only requirement for obtaining the relative readings is that the fluids have substantially different dielectric constants. This is clearly the case where salt water is employed in a fuel storage tank in order to displace or remove the oil.

The present circuitry can be readily miniaturized, consisting of integrated circuits and small discrete components. It will be readily understood that the circuitry in FIG. 1 which is shown as being external to the tank could easily be incorporated on an additional printed circuit board or even on the same circuit board as the probe device, with the components being potted following assembly in order to protect them from the effect of the liquids in the tank.

The device thus represents a distinct advance and improvement in level gauging technology.

Variations and modifications are possible without departing from the spirit of the invention.

I claim:

1. A liquid indicator device for gauging relative proportions of two immiscible liquids of different density disposed one above the other in a storage tank, comprising in combination:
   a. a source of electrical signals,
   b. an upright, electrically conducting probe part immersed in the liquids being gauged and passing through the interface formed therebetween, said probe part being connected with the source to receive signals therefrom,
   c. A second probe part cooperable with the first part, said second part comprising an upright row of electrodes insulated from each other and immersed in said liquids in proximity to the first-mentioned probe part,
   d. first detector means responsive to signals from said source and connected with said second probe part for designating which of the electrodes of said upright row are submerged in one of said liquids, and
   e. additional detector means operative substantially at the same time as said first detector means, responsive to signals from said source and connected with said second probe part for designating which of the electrodes of said upright row are submerged by either of said liquids.

2. A probe device as in claim 1, and further including:
   a. an elongate piece of insulating material on which said probe parts are carried,
   b. means carried by said insulating piece, providing electrical circuits to said probe parts, and
   c. means providing an insulating barrier, covering portions of said probe parts and sealing the same from the liquids.

3. A probe device as in claim 2, wherein:
a. said elongate piece comprises a printed circuit board,
b. said probe parts comprising metal tracks bonded to said board,
c. said barrier providing means comprising a coating of insulating resin applied to the board.

4. A probe device as in claim 2, wherein:
a. said elongate piece comprises a sheet of dielectric film,
b. said probe parts comprising metal tracks bonded to said film,
c. said barrier providing means comprising an additional sheet of dielectric film disposed against the first and covering said tracks.

5. A probe device as in claim 2, wherein:
a. said probe parts have multiple conducting fingers,
b. fingers of one of said probe parts being interleaved with fingers of the other of said parts.

6. A probe device as in claim 2, wherein:
a. said circuit providing means comprises a plurality of rectifiers carried by said insulating material,
b. said rectifiers each having one lead connected in circuit respectively with said electrodes.

7. A probe device as in claim 1, wherein:
a. said first detector means comprises amplifier means having input circuitry connected with said electrodes to receive signals therefrom.

8. A probe device as in claim 1, wherein:
a. both of said detector means are connected with said electrodes of said second probe part,
b. said liquids being characterized by unequal dielectric constants, respectively,
c. the electrodes of said row forming with the upright probe part a plurality of capacitors, respectively, such that a signal applied to said conducting probe part is capacitively coupled to each of said electrodes, the amplitude of the signal appearing on an electrode being a function of the dielectric constant of the material surrounding the capacitor,
d. said first detector means comprising an indicator and an amplifying device having an output connected to drive the indicator, said amplifying device having inputs connected with said electrodes and further having means enabling it to respond only to signals from the electrodes having an amplitude greater than a predetermined value, whereby the first detector means selectively indicates the total number of electrodes which are submerged in only the liquid having the higher dielectric constant.

9. A probe device as in claim 8, wherein:
a. both of said liquids have dielectric constants respectively greater than that of air,
b. said additional detector means comprising an additional indicator and an additional amplifying device having an output connected to drive the additional indicator, said additional amplifying device having inputs connected with said electrodes and further having means enabling it to respond only to signals from the electrodes having an amplitude greater than a second predetermined value, whereby the additional detector means selectively indicates the total number of electrodes which are submerged in either of the two liquids, but not by the air.

10. A probe device as in claim 8, wherein:
a. the amplifying device comprises a plurality of comparator amplifiers, each having inputs connected respectively to receive signals from said electrodes,
b. said enabling means comprising a voltage supply providing a fixed bias voltage to the inputs of said comparators such that the latter do not respond to signals from the electrodes until such signals exceed said predetermined value,
c. said comparator amplifiers being connected to said indicator through a summing network.

11. A probe device as in claim 9, wherein:
a. the additional amplifying device comprises a plurality of additional comparator amplifiers, each having inputs connected respectively to receive signals from said electrodes,
b. the enabling means of said additional amplifying device comprising an additional voltage supply providing a fixed bias voltage to the inputs of said additional comparator amplifiers such that the latter do not respond to signals from the electrodes until such signals exceed said second predetermined value,
c. said additional comparator amplifiers being connected to said additional indicator through an additional summing network.

12. A probe device as in claim 10, and further including:
a. a plurality of detector networks each comprising a diode and capacitor interposed between the electrodes and comparator amplfiers, respectively,
b. said networks being adapted to convert a.c. signals from said electrodes respectively to pulsating d.c. levels at the inputs of the comparators.

13. A probe device as in claim 12, wherein:
a. said diodes are connected to the electrodes and disposed immediately adjacent the locations of the latter, respectively.

14. A probe device as in claim 10, wherein:
a. said summing network respectively comprises resistors connected with the outputs of the comparator amplifiers, and diodes connected with the indicator.

15. A probe device for immersion in a body of liquid, comprising in combination:
a. an elongate piece of insulating material adapted to be supported in the liquid in an upright position,
b. a plurality of conducting members carried by the insulating piece and disposed at spaced intervals along the length thereof,
c. a second plurality of conducting members connected to each other and carried by the insulating piece, the conducting members of said second plurality being located at spaced intervals on said insulating piece and being disposed adjacent the conducting members of said first plurality respectively,
d. means carried by said insulating piece, providing electrical circuits to said conducting members,
e. means providing an insulating barrier, covering said conducting members and sealing the same from the liquid,
f. said circuit providing means includes rectifier devices directly carried by the insulating material, said devices being completely surrounded by and sealed by said insulating barrier, each device having one terminal connected respectively to the conducting members of said first plurality, g. said devices being adapted to receive a.c. signals from the conducting members respectively of said first plurality and to convert the signals to pulsating d.c. levels, and h. means carried by said insulating material for making electrical connections between the other terminals of each of said rectifier device and external circuitry.

* * * * *